United States Patent
Brown et al.

(10) Patent No.: US 10,002,369 B2
(45) Date of Patent: *Jun. 19, 2018

(54) DETECTING CONTENT AND USER RESPONSE TO CONTENT

(71) Applicant: comScore, Inc., Reston, VA (US)

(72) Inventors: Michael A. Brown, Ashburn, VA (US); Xinyu Huang, Great Falls, VA (US); Glen Grant, Springfield, VA (US)

(73) Assignee: comScore, Inc., Reston, VA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/436,412

(22) Filed: Feb. 17, 2017

(65) Prior Publication Data

US 2017/0300962 A1    Oct. 19, 2017

Related U.S. Application Data

(63) Continuation of application No. 14/633,431, filed on Feb. 27, 2015, now Pat. No. 9,578,118, which is a continuation of application No. 13/241,588, filed on Sep. 23, 2011, now Pat. No. 8,972,565, which is a continuation of application No. 11/842,816, filed on Aug. 21, 2007, now Pat. No. 8,060,601.

(60) Provisional application No. 60/916,049, filed on May 4, 2007, provisional application No. 60/913,224, filed on Apr. 20, 2007, provisional application No. 60/893,599, filed on Mar. 7, 2007.

(51) Int. Cl.
| | |
|---|---|
| *G06F 15/16* | (2006.01) |
| *G06Q 30/02* | (2012.01) |
| *H04L 29/08* | (2006.01) |
| *G06F 17/30* | (2006.01) |

(52) U.S. Cl.
CPC ... *G06Q 30/0246* (2013.01); *G06F 17/30887* (2013.01); *G06Q 30/0277* (2013.01); *H04L 67/22* (2013.01)

(58) Field of Classification Search
USPC ........................................................ 709/224
See application file for complete search history.

(56) References Cited

U.S. PATENT DOCUMENTS

| | | | |
|---|---|---|---|
| 5,675,510 A | 10/1997 | Coffey | |
| 5,870,546 A | 2/1999 | Kirsch | |
| 6,108,637 A | 8/2000 | Blumenau | |
| 6,115,680 A | 9/2000 | Coffee | |

(Continued)

FOREIGN PATENT DOCUMENTS

WO    WO1999013423 A1    3/1999

OTHER PUBLICATIONS

Brown, Michael A., Declaration of Michael Brown, dated Jun. 18, 2010, 5 pages.

(Continued)

*Primary Examiner* — Bunjob Jaroenchonwanit
(74) *Attorney, Agent, or Firm* — Baker & Hostetler LLP

(57) ABSTRACT

A first set of data including a first tracking identifier for a first webpage component and a destination address for the first webpage component is accessed. A second set of data that includes an address for retrieving a second webpage component, is accessed. The address includes a second tracking identifier. Whether the second tracking identifier is the same as the first tracking identifier is determined. The second webpage component is associated with the destination address when the second tracking identifier is the same as the first tracking identifier.

20 Claims, 11 Drawing Sheets

(56) References Cited

U.S. PATENT DOCUMENTS

| | | | |
|---|---|---|---|
| 6,138,155 | A | 10/2000 | Davis |
| 6,199,107 | B1 | 3/2001 | Dujari |
| 6,338,094 | B1 | 1/2002 | Scott |
| 6,470,383 | B1 | 10/2002 | Leshem |
| 6,622,168 | B1 | 9/2003 | Datta |
| 6,643,696 | B2 | 11/2003 | Davis |
| 6,763,386 | B2 | 7/2004 | Davis |
| 7,171,471 | B1 | 1/2007 | Nair |
| 7,353,246 | B1 | 4/2008 | Rosen |
| 7,400,639 | B2 | 7/2008 | Madukkarumukumana |
| 7,860,895 | B1 | 12/2010 | Scofield |
| 2003/0163370 | A1 | 8/2003 | Chen |
| 2004/0128534 | A1 | 7/2004 | Walker |
| 2004/0205149 | A1 | 10/2004 | Dillon |
| 2005/0021397 | A1 | 1/2005 | Cui |
| 2005/0138143 | A1 | 6/2005 | Thompson |
| 2005/0235030 | A1 | 10/2005 | Lauckhart |
| 2006/0069617 | A1 | 3/2006 | Milener et al. |
| 2006/0264201 | A1 | 11/2006 | Zhang |
| 2006/0294068 | A1 | 12/2006 | Li |
| 2008/0025243 | A1 | 1/2008 | Corneille et al. |
| 2009/0012869 | A1 | 1/2009 | Henkin |
| 2009/0019073 | A1 | 1/2009 | Itoh |

OTHER PUBLICATIONS

Cohen, E. and Kaplan, H. "Prefetching the Means for Document Transfer: A New Approach for Reducing Web Latency," in Proceedings of the IEEE INFOCOM'00 Conference. Oct. 10, 2000.

Cohen, E., and Kaplan, H., "Prefetching the Means for Document Transfer: A New Approach for Reducing Web Latency," Computer Networks, vol. 39, Issue 4, Jul. 2002, pp. 437-455; reprinted from www.math.tau.ac.il/~haimk/papers/prefetch.ps, on Dec. 29, 2008.

Domenech, J.; Gil, J.A.; Sahuquillo, J.; Pont, A.; , "DOG: An Efficient Prefetching Algorithm for Current Web Generation," Hot Topics in Web Systems and Technologies, 2006. Hotweb '06. 1 st I EEE Workshop on , vol., No., pp. 1-12, Nov. 13-14, 2006, URL:<http://ieeexplore.ieee.org/stamp/stamp.jsp?tp=&arnumber=4178377&isnum> accessed on Jan. 18, 2011 (13 pages).

Fisher, Darin, "Link prefetching FAQ", Mar. 3, 2003, URL:<https://developer.mozilla.org/en/Link_prefetching_FAQ> accessed on Jan. 18, 2011 (7 pages).

Hughes, A. S. and Touch, J.D., "Expanding the Scope of Prefetching through Inter-Application Cooperation," 2001; reprinted from http://citeseerx.ist.psu/edu/viewdoc/summary?doi=10.1.1.19.6271 on Dec. 29, 2008.

Nidd, T., et al., "Prefetching DNS Lookup for Efficient Wireless WWW Browsing," Proceedings of Wireless 97, the 9th Annual International Conference on Wireless Communications, Calgary, Alberta, Canada, pp. 409-414, Jul. 1997; reprinted from http://citeseerx.ist.psu.edu/viewdoc/summary?doi=10.1.1.40.2184 on Dec. 28, 2008.

Waterson, C., "Mozilla: Performance: Projects," last updated on Sep. 17, 1998; reprinted from http://www.mozilla.org/performance/projects.html on Dec. 29, 2008.

U.S. Appl. No. 11/842,848, filed Aug. 21, 2007, 43 pages.

U.S. Appl. No. 11/842,860, filed Aug. 31, 2007, 42 pages.

U.S. Appl. No. 12/253,132, filed Oct. 16, 2008 (34 pages).

Non-Final Office Action issued in U.S. Appl. No. 11/842,860 dated Nov. 19, 2009, 15 pages.

Final Office Action issued in U.S. Appl. No. 11/842,860 dated Aug. 3, 2010, 13 pages.

Notice of Allowance issued in U.S. Appl. No. 11/842,860 dated Feb. 2, 2011, 10 pages.

Notice of Allowance for U.S. Appl. No. 11/842,860, dated May 10, 2011 (14 pages).

Notice of Allowance issued in U.S. Appl. No. 11/842,860, dated Jun. 21, 2011, 12 pages.

Non-Final Office Action issued in U.S. Appl. No. 13/204,305 dated Nov. 15, 2011, 12 pages.

Final Office Action issued in U.S. Appl. No. 13/204,305 dated Jun. 22, 2012, 12 pages.

Notice of Allowance issued in U.S. Appl. No. 13/204,305 dated Nov. 13, 2012, 8 pages.

Non-Final Office Action for U.S. Appl. No. 12/253,132 dated Feb. 3, 2011 (24 pages).

Final Office Action issued in U.S. Appl. No. 12/253,132 dated Sep. 23, 2011, 45 pages.

Non-Final Office Action issued in U.S. Appl. No. 11/842,848 dated Oct. 29, 2009, 13 pages.

Final Office Action issued in U.S. Appl. No. 11/842,848 dated Jul. 21, 2010, 17 pages.

Non-Final Office Action issued in U.S. Appl. No. 11/842,848 dated Mar. 28, 2011, 16 pages.

Final Office Action issued in U.S. Appl. No. 11/842,848 dated Nov. 25, 2011, 25 pages.

Office Action issued in U.S. Appl. No. 11/842,848 dated Aug. 22, 2013, 31 pages.

Notice of Allowance issued in U.S. Appl. No. 11/842,848 dated Jun. 24, 2014, 16 pages.

```
<udata ci="7" et="0" pr="0" ro="219">
  <nsrecord>
    <request>
      <mt>GET</mt>
      <url>http://www.fxcmtr.com/welcome/why-trade-currencies/oil-crashes.html?engine=yahoo+finance+ros+300*250&CMP=SFS-70130000003U6MAAU&keyword=01149b</url>
      <cv>HTTP/1.1</cv>
      <rf>http://view.atdmt.com/FXM/iview/yhxxxeng0010000350fxm/direct/01/?time=1172697804750349&click=http://us.ard.yahoo.com/SIG=12ds1an18/M=532266.8765324.9564585.1435155/D=fin/S=7037371:LREC/Y=YAHOO/EXP=1172705004/A=3749567/R=0/*</rf>
      <ua>Mozilla/4.0 (compatible; MSIE 7.0; Windows NT 5.1; .NET CLR 1.1.4322; .NET CLR 2.0.50727; InfoPath.1)</ua>
      <clk csu="http://finance.yahoo.com/" csu_id="1E57C253-E57F-48CA-9B30-57362E3E1323" h="250" hash="47b2ef333cb8b87ccd8e98818fb0bd2b" id="165538687" idx="3" link="http://spe.atdmt.com/b/fxfxmfxcmeng/01149b_300x250.gif" tag="img" te="8813" w="300"></clk>
    </request>
    <reply>
      <rc>200</rc>
      <rs>OK</rs>
      <ct>text/html;charset=iso-8859-1</ct>
    </reply>
  </nsrecord>
</udata>
```

FIG. 6

DETECTING CONTENT AND USER RESPONSE TO CONTENT

CROSS REFERENCE TO RELATED APPLICATIONS

This application is a continuation of U.S. application Ser. No. 14/633,431, filed Feb. 27, 2015, which is a continuation of U.S. application Ser. No. 13/241,588, filed Sep. 23, 2011, issued as U.S. Pat. No. 8,972,565 on Mar. 3, 2015, which is a continuation of U.S. application Ser. No. 11/842,816 filed Aug. 21, 2007, issued as U.S. Pat. No. 8,060,601 on Nov. 15, 2011, which claims the benefit of: U.S. Provisional Application No. 60/893,599, filed Mar. 7, 2007; U.S. Provisional Application No. 60/913,224, filed Apr. 20, 2007; and U.S. Provisional Application No. 60/916,049, filed May 4, 2007. All of these applications are incorporated herein by reference in their entirety.

TECHNICAL FIELD

This disclosure relates to detecting content and user response to content.

BACKGROUND

Webpages may include various components including advertisements that viewers of the webpage may select. The advertisements or other components each may be associated with a Uniform Resource Locator (URL) address that points to a destination website.

SUMMARY

In one general implementation, a first set of data including a first tracking identifier for a first webpage component and a destination address for the first webpage component is accessed. A second set of data that includes an address for retrieving a second webpage component is accessed. The address includes a second tracking identifier. Whether the second tracking identifier is the same as the first tracking identifier is determined. The second webpage component is associated with the destination address when the second tracking identifier is the same as the first tracking identifier.

Implementations may include one or more of the following features. The first set of data may include a campaign dictionary, and a third set of data including a first address for retrieving a first webpage component and a destination address for the first webpage component also may be accessed. The address for retrieving the webpage component may include the first tracking identifier. The first tracking identifier may be extracted from the accessed data, and the extracted first tracking identifier in the campaign dictionary may be stored. The destination address may be stored in the campaign dictionary such that the destination address is associated with the first tracking identifier. Extracting the first tracking identifier may include generating data extraction rules, creating a data extraction pattern based on the rules, and applying the data extraction pattern to the third set of data to extract the first tracking identifier. The data extraction pattern may be a regular expression.

In another example, the first and second tracking identifiers may be associated with an advertisement server and the first and second webpage components may be advertisements. The first web page component may be an advertisement selected by a first member of a panel and the second webpage component may be an advertisement displayed to a second member of the panel and not selected by the second member of the panel.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 6 illustrates an example of the data a client system sends to a collection server.

DETAILED DESCRIPTION

Figure 1:
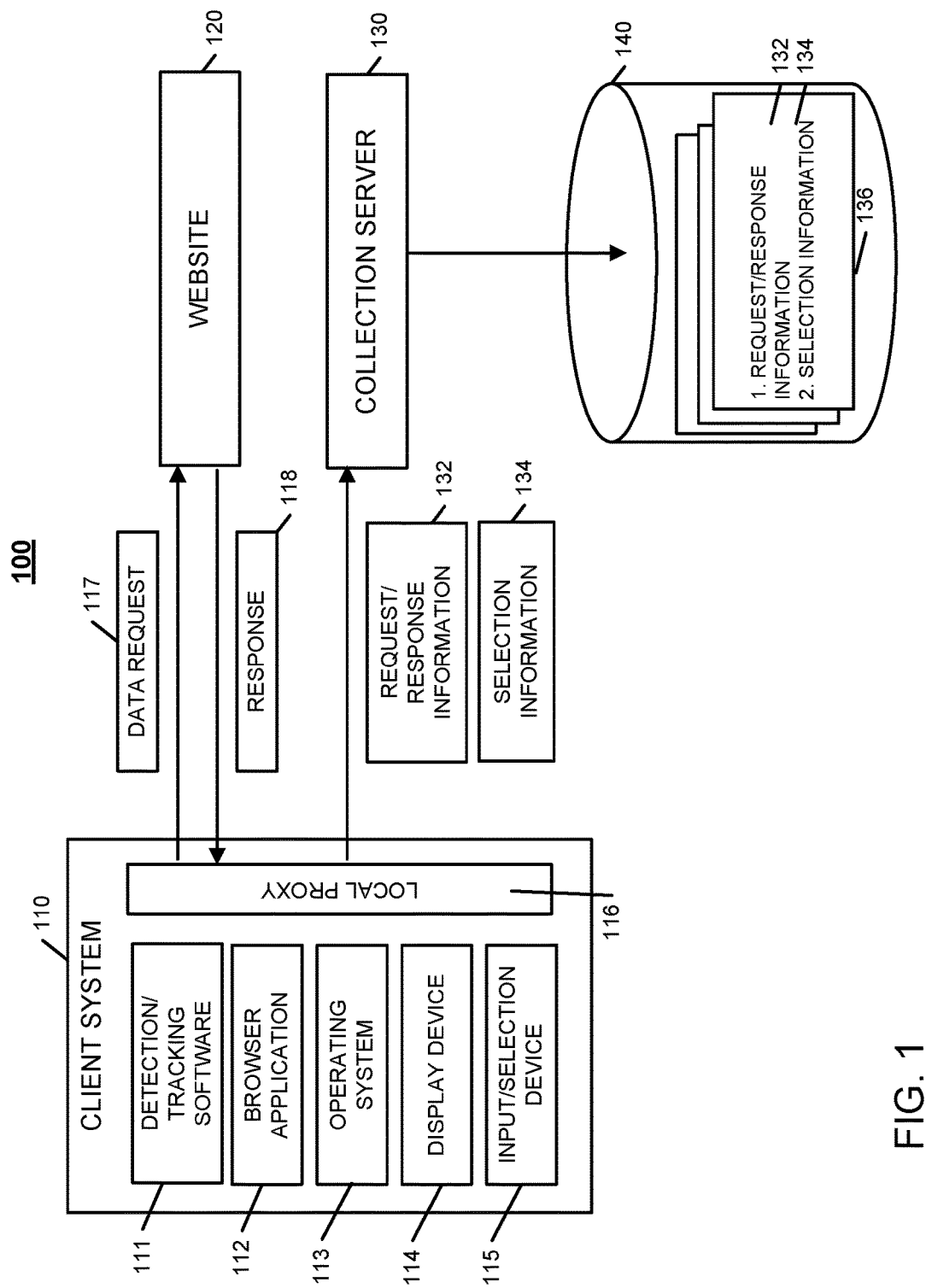
FIG. 1 illustrates an example of a system that generally provides for the collection and analysis of data regarding the use of web resources by, for example, a panel of computer users.

In general, data about the items included in a webpage that are selected by one or more users, and the data request(s) and response(s) resulting from the selection(s) may be collected and analyzed to determine certain information. For example, collecting and analyzing such data may provide information such as the destination webpage for a given advertisement displayed on a webpage. Collecting and analyzing such data may allow the destination webpage to be determined, even when selecting the advertisement results in the browser being redirected through one or more intermediate websites before being directed to the destination webpage for the advertisement. When such redirection occurs, the information associated with the advertisement (e.g., the uniform resource locator (URL) to which the advertisement points) may not include any information that provides an indication of the destination webpage. Thus, simply reviewing such information may not yield useful information about the destination of the advertisement. However, the destination webpage may be determined by collecting and analyzing data about the user's selection, and the subsequent request(s) and response(s).

Additionally, collecting and analyzing such data may provide for information such as the number of impressions (presentation of an advertisement with or without it being selected) that occur during a particular advertising campaign, even though different advertisements are used during the campaign and/or the advertisement(s) for a campaign are distributed using multiple ad networks. For example, an advertiser may include one or more particular advertisements (which may be referred to as creatives) in a given advertising campaign. As part of that campaign, the advertiser also may distribute the creatives using multiple ad networks. This may create difficulties because, even though the same advertisement is distributed on the multiple ad networks, the ad networks may identify the particular advertisement differently and/or may make minor changes to the advertisement. Furthermore, it may be otherwise difficult to determine that different advertisements are part of the same campaign. As described further below, collecting and analyzing items included in a webpage and selected by one or more users, and the resultant data requests and responses may provide information that allows advertisements that are part of the same campaign to be identified based, for instance, on portions of the URL for the advertisement, even if those advertisements have not been selected, but rather are simply presented.

In addition, gathering information about impressions may be impacted by how such data is collected. For example, the Internet activities of a panel of Internet users may be observed to collect the data on what items are selected and the data request(s) and response(s) that result from the selection. The users may represent a particular demographic of interest to advertisers, or the panel may represent an average Internet user. However, when the panel is a relatively small sample of such Internet users, the panel's activities may not include selecting all advertisements included in a particular advertising campaign. Moreover, some advertisements may not be selected at all by a panel member, but they may be selected (at least in a small number) by the larger Internet community. Therefore, there may be advertising images in a campaign that have not been selected by any members of the panel and therefore for which there is no information about the destination address of the advertisement, which makes it difficult to determine what campaign the ad may be a part of. As described some above, and further below, collecting and analyzing items included in a webpage and selected by one or more users, and the resultant data requests and responses may provide information that allows advertisements that are part of the same campaign to be identified based, for instance, on portions of the URL for the advertisement, even if those advertisements have not been selected by members of the panel, but rather are simply presented to members of the panel.

FIG. 1 illustrates an example of a system 100 that generally provides for the collection and analysis of data regarding the use of web resources by, for example, a panel of computer users. The collection and analysis of this data may yield information such as the destination webpage of an advertisement in, for example, the situation where the advertisement links to an intermediate website and, therefore, analysis of the advertisement itself may not indicate the destination webpage. Additionally, the collection and analysis of this data also may yield the number of impressions of that occur for one or more advertisements that are part of a particular campaign over a given period, even though the advertisement(s) are distributed by multiple, different ad networks.

In particular, the data collection system 100 includes a client system 110, a website 120, a collection server 130, and a data store 140. The client system 110 is capable of communicating with the website 120 and the collection server 130 over a network such as, for example, the Internet. The client system 110 requests data from a website 120 and receives data from the website 120. The client system 110 also sends data to a collection server 130. The collection server 130 stores data received from the client system 110 in the data store 140.

More specifically, the client system 110 includes a detection/tracking software application 111, a browser application 112, an operating system 113, a display device 114, an input/selection device 115, and a local proxy 116. As explained in more detail below with respect to FIGS. 4 and 5, the detection/tracking software 111 tracks the position of a cursor associated with the input/selection device 115 and stores information related to selections made in the browser application 112 with the input/selection device 115. The input/selection device 115 may include, for example, a mouse, a stylus, and/or a keyboard. The detection/tracking software 111 communicates with the local proxy 116. In the example shown in FIG. 1, the detection/tracking software 111 and the local proxy 116 are implemented as separate applications that are in communication with each other. Thus, the detection/tracking software 111 acts as part of the local proxy 116. In other implementations, the detection/tracking software 111 may be integrated into the local proxy 116 such that the detection/tracking software 111 and the local proxy 116 are a single application on the client system 110.

The browser application 112 displays web pages on the display device 114. The browser application 112 communicates with the detection/tracking software 111 such that the detection/tracking software 111 can track the items that the user of the client system 110 selects in the browser window. The browser application 112 also communicates with the local proxy 116 such that a data request 117 made by the browser application 112 to the website 120 is received by the local proxy 116 and sent to the website 120 by the local proxy 116. The local proxy 116 receives data response 118 from the website 120 and communicates the response 118 to the browser application 112. The response 118 may include the requested data or data other than, or in addition to, the requested data. For example, the response 118 may include a redirect command, or another hypertext transfer protocol (HTTP) status code, such as a status code 200 indicating a successful request for data. The browser application 112 may display the requested data 112 on the display device 114.

The local proxy 116 also communicates with the collection server 130. In particular, the local proxy 116 sends request/response information 132 to the collection server 130. The request/response information 132 may include, for example, information about the data request 117 made to the website 120 by the browser application 112. The request/response information 132 also may include information about the response 118 received from the website 120.

In addition, the local proxy 116 communicates selection information 134 to the collection server 130. The selection information 134 includes information collected by the detection/tracking software 111 related to the user's mouse click, or other selection, that resulted in the data request 117 and/or subsequent data requests. As described in greater detail below with respect to FIGS. 4 and 5, the selection information 134 may include, for example, a time and date stamp indicating when the selection occurred, the uniform resource locator (URL) or other identifier for the webpage that the browser application 112 was displaying when the user selected an item (e.g., an advertisement), the dimensions of the selected item, the type of data included in the selected item, and the URL or other identifier associated with the selected item.

Figure 3:
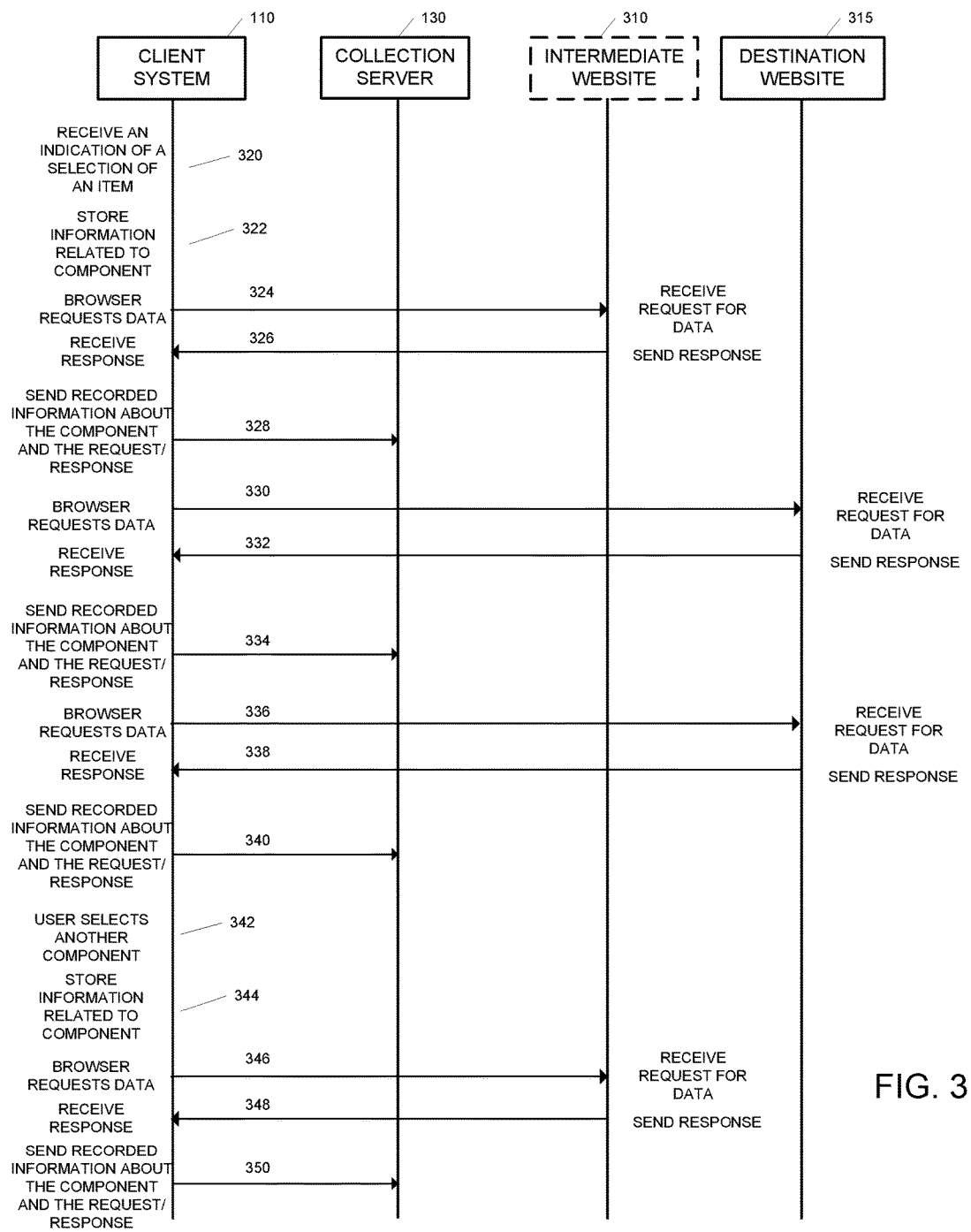
FIG. 3 illustrates communications between a client system, a collection server, an intermediate website, and a destination website.

As explained in greater detail with respect to FIG. 3, the browser application 112 may make many data requests 117 based on one user selection of an item in a webpage. In this case, the local proxy 116 sends request/response information 132 to the collection server 130 for each data request 117. While doing so, the local proxy 116 continues to send the same selection information 134 with the request/response information 132 sent for each data request 117. Thus, for each data request 117 that occurs because of the user's selection of an item, the local proxy may send a message to the collection server 130 that includes the request/response information 132 corresponding to the particular data request and the selection information corresponding to the user selection that resulted in the data requests 117.

The collection server 130 receives the request/response information 132 along with the selection information 134 associated with the selection that resulted in the data request 117 and the requested data 118. The collection server 130 stores the request/response information 132 and the associated selection information 134 in the data store 140. The request/response information 132 and the associated selection information 134 may be stored together in a data record 136. Processing and analyzing this data may produce useful information. For example, as described in greater detail below, particularly with respect to FIGS. 7-11, the data included in the data store 140 may be used to associate the item that the user selected (e.g., an advertisement) with the destination webpage or website the user reached as a result. Additionally, the data included in the data store 140 may be used to determine the number of impressions for a particular advertisement during a campaign, even when the advertisement is distributed by different ad networks.

In the example data collection system 100 shown in FIG. 1, there is one collection server 130. However, in other implementations, there may be many collection servers 130. Additionally, in the example shown in FIG. 1, the data store 140 is separate from the collection server 130, though this is not necessarily the case. In some implementations, the data store 140 may be a component of the collection server 130. Additionally, some implementations may have more than one data store 140.

Figure 2:
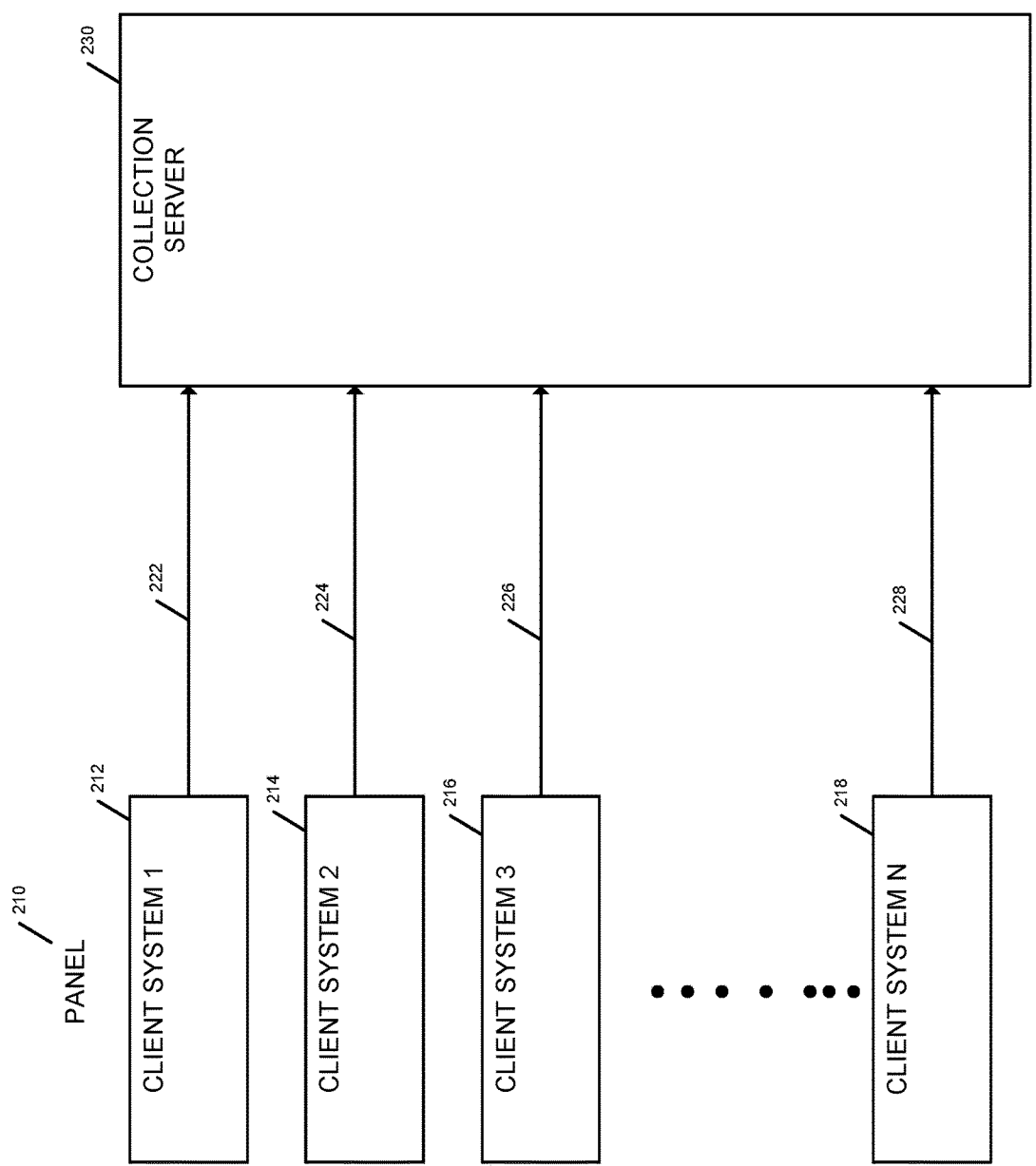
FIG. 2 illustrates a system in which a panel of computer users transmit data to a collection server.

Referring to FIG. 2, a panel of computer users 210 transmit data to a collection server 230. The panel of users 210 may be a group of users that are representative of a larger group of users. For example, the panel of users 210 may be composed such that the panel reflects an average Internet user. In another example, the panel of users 210 may be composed of users belonging to one or more demographic groups of interest to providers of goods and services.

In the example shown in FIG. 2, the panel of users 210 includes client systems 212, 214, 216, and 218. However, in other implementations, the panel 210 may be composed of more or fewer client systems. Each of the client systems 212, 214, 216, and 218 may be similar to the client system 110 described above with respect to FIG. 1. In particular, each of the client systems 212, 214, 216, and 218 includes the detection/tracking software 111, the browser application 112, the input/selection device 115, and the local proxy 116.

Thus, each of the client systems 212, 214, 216, and 218 sends data 222, 224, 226, and 228, respectively, to the collection server 230 where the data 222, 224, 226, and 228 is stored and processed. The data 222, 224, 226, and 228 may be, for example, the response/request information 132 and/or the selection information 134 described above with respect to FIG. 1.

The collection server 230 may be similar to the collection server 130 described above with respect to FIG. 1. For example, the collection server 230 may include a data store 140 to store the data 222, 224, 226, and 228. In the example shown in FIG. 2, there is one collection server 230. However, in other implementations there may be more than one collection server 230. For example, each of the client systems 212, 214, 216, and 218 may send data 222, 224, 226, and 228 to more than one collection server for redundancy. In other implementations, the client systems 212, 214, 216, and 218 may send data 222, 224, 226, and 228 to different collection servers. In this implementation, the data 222, 224, 226, and 228, which represents data from the entire panel, may be communicated to and aggregated at a central location for later processing. In this implementation, the central location may be one of the collection servers.

Referring to FIG. 3, the client system 110 sends data to and receives data from the collection server 130, an intermediate website 310, and a destination website 315. The intermediate website 310 and the destination website may be similar to the website 120 described with respect to FIG. 1.

The client system 110 receives an indication of a selection of an item (320). The selected item may be an image, such as an advertising image, displayed in a webpage. As described in more detail with respect to FIGS. 4 and 5, information related to the selected item is stored on the client system 110 (322). In response to the selection of the item, the browser application 112 makes a request for data from the intermediate website 310 (324). For example, the selected item may be associated with a uniform resource locator (URL) such that when the item is selected, the browser sends a request for data to a server associated w/the URL. In the example shown in FIG. 3, the selected item is associated with the URL of the intermediate website 330, and the client system 110 makes a request for data from the intermediate website 310. In response to the request for data received from the client system 110, the intermediate website 310 sends a response to the client 310 (326). The response may include data for display by the browser application 112 and/or a response from the intermediate website 310 other than data for display, such as a redirect command. The client system 110 sends information about the request for data and the response received, and information related to the selected item stored on the client to the collection server 130 (328).

In the example shown in FIG. 3, the intermediate website 310 sends a redirect command in response to the request for data (326). The redirect command causes the browser application 112 to make another request for data (330). In this example, the redirect command directs the browser application 112 to request data from the destination website 315. In other examples, the redirect command may direct the browser application 112 to request data from yet another intermediate website. The destination website 315 responds with data that may include data for display by the browser application 112 and/or a response other than data for display (332). For example, the response from the destination website 315 may include a hypertext transfer protocol (HTTP) status code, such as a status code 200 indicating a successful request for data. The client system 110 sends information about the request for data, the response received, and the information related to the selected item stored on the client to the collection server 130 (334). Thus, the information about the request for data made in (330) and the response received in (332) are sent to the collection server 130 with the same information about the selected item as the earlier request for data made to the intermediate website 315 made in (324) and the response received in (326). For each data request that occurs as a result of the user's selection of the item, the client system 110 may send information to the collection server 130 that includes information about the request and response along with the selection information for the user selection that resulted in the data request(s).

The browser 112 may make a second request (or more) for data from the destination website 315 (336). The second request for data (336) may be to retrieve items included in the web page received from the destination website 315 in (332). For example, the second request (336) may retrieve images referenced by the webpage such that the images are displayed within the webpage shown by the browser application 112. The destination website 315 sends a response to the client system 110 (338). The client system 110 sends information about the request for data and the response received, and information related to the selected item stored on the client to the collection server 130 (340).

Thus, in one implementation, the client system 110 continues to send to the collection server 130 the selection information with the information about the requests/responses that resulted from the user selection until another user selection is made. At that point, the client then sends the new selection information to the collection server 130 with the information about requests/responses that result from the new selection. For instance, the client system 110 may receive an indication of a selection of another item included in a web page (342). The selection may be made, for example, using a mouse or through another input device such as a keyboard or stylus. The selected item may be a different item than the one selected in (320), or it may be the same item. In another example, the indication of a selection of an item may be receipt of an entry in the address bar of the browser application. Information about the selected item is stored on the client system 110 (344). Similar to the process described above, the selection of the other item causes the browser application to request data from a website associated with the other item (346). In the example shown in FIG. 3, the browser requests data from the intermediate website 310. In other examples, the selected item may be associated with a URL that references the destination website 315, another intermediate website, or another destination website such that the browser application 112 requests data from the referenced website. In the example shown, the intermediate website 310 sends a response to the client system 110 (348). The client system 110 sends information about the request (346) and the response (348) to the collection server 130 (350) along with the new information about the newly selected item (344).

Figure 4:
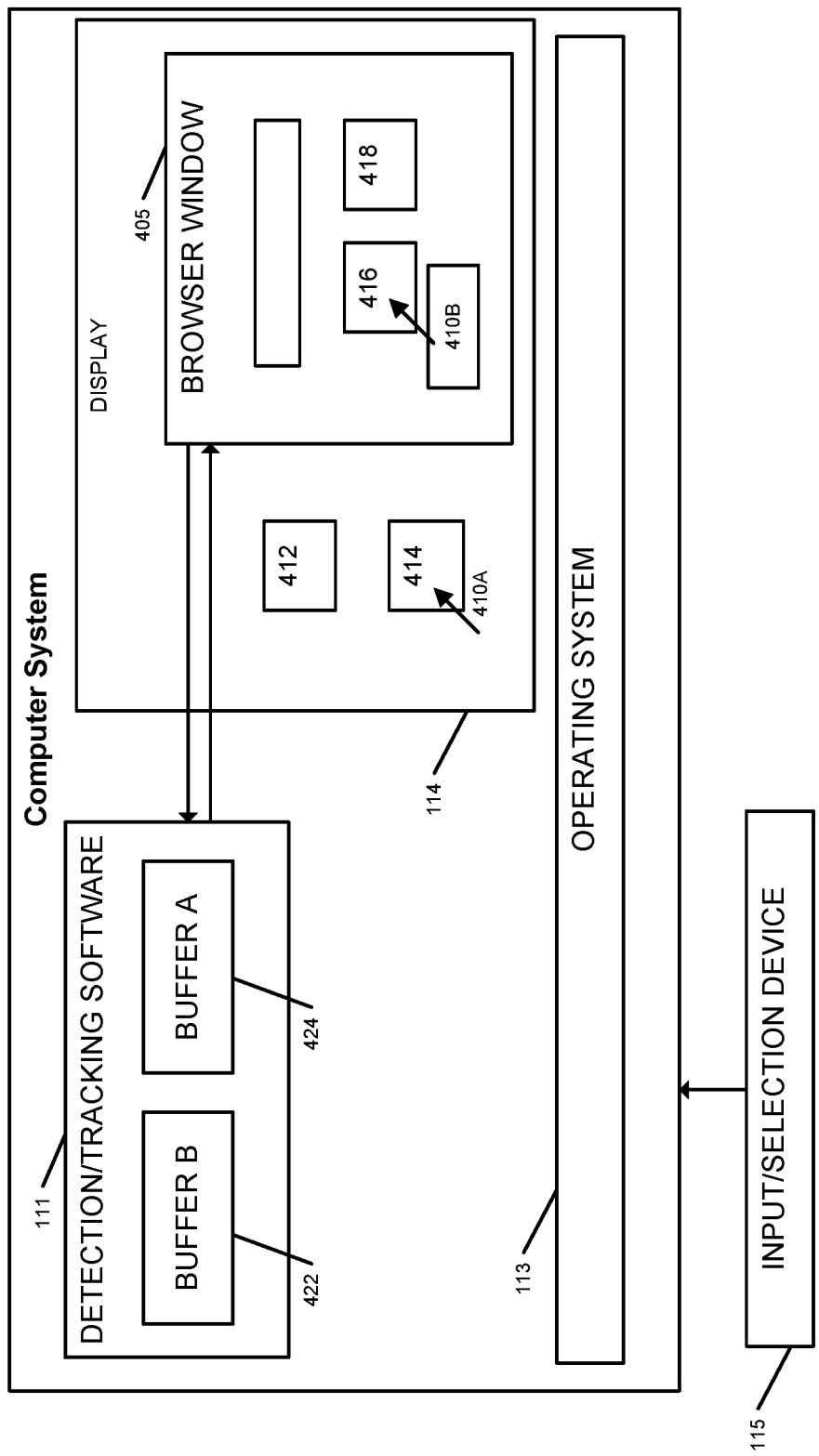
FIG. 4 illustrates a client system.

Referring to FIG. 4, a client system 110 tracks the position of a cursor 410 that is displayed on the display device 114 and that is associated with the input/selection device 115. The client system 110 also records information related to items that the user selects with the input/selection device 115. The client system 110 includes the detection/tracking software 111 the display device 114, the browser application 112, the operating system 113, and the input/selection device 115.

The browser application 112 displays a browser window 405 on the display device 114. Items 412, 414, 416, and 418 are also displayed on the display device 114. In the example shown in FIG. 4, items 412 and 414 are not displayed in the browser window 405 (e.g., they are displayed on a desktop shown by display 114), and items 416 and 418 are displayed in the browser window 405. The client system 110 also includes the detection/tracking software 111, which communicates with the browser application 112. The detection/tracking software 111 includes two buffers, buffer A 422, and buffer B 424. The example shown in FIG. 4 illustrates the cursor 410 in two different positions, position 410A, which is outside of the browser window 405, and position 410B, which is inside of the browser window 405.

Figure 5:
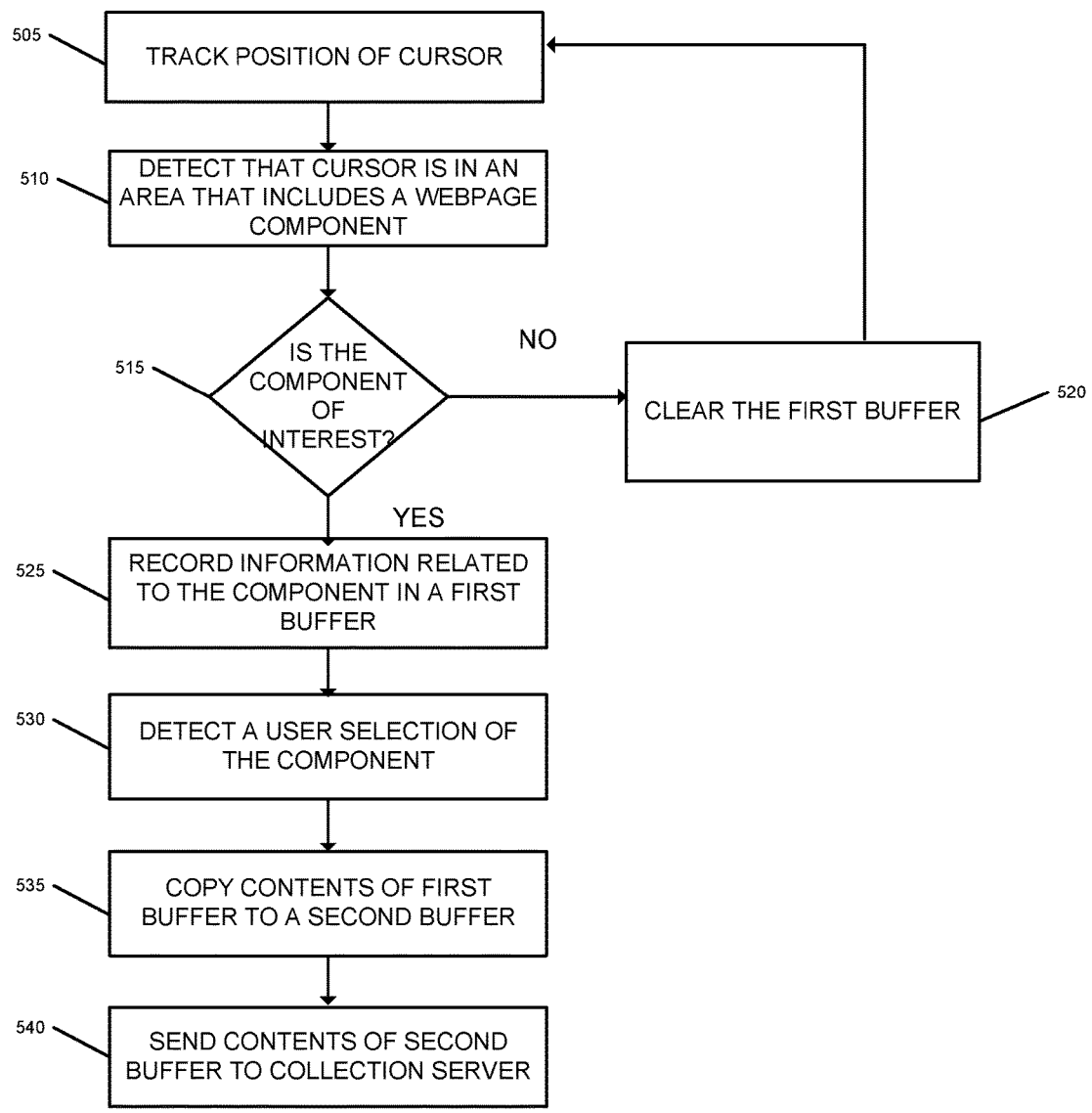
FIG. 5 illustrates a process that detects and tracks the position of a cursor associated with an input/selection device of a client system.

Referring also to FIG. 5, an example process 500 detects and tracks the position of the cursor 410 associated with the input/selection device 115. The process 500 may be performed by the detection/tracking software 111, which may run on a processor included in the client system 110. The process 500 begins when the detection/tracking software 111 tracks the position of the cursor 410 displayed on the display device 114, for example, by observing messages dispatched by operating system 113 (505). The detection/tracking software 111 detects that the cursor 410 is in an area that includes a webpage component (510). For example, the detection/tracking software 111 may detect that the cursor 410 moved from position 410A to 410B and is in an area of the display that includes a webpage component. Thus, once the cursor is at position 410B, the detection/tracking software 111 may detect that the cursor is "hovering" in an area that includes a webpage component. The webpage component may be, for example, an image included in the webpage displayed by the browser application 112. The webpage component also may include multimedia content and/or textual content. In the example shown in FIG. 4, the item 416 may be an image displayed by the browser application 112. In this example, the detection/tracking software begins tracking when the cursor 410 is over the item 416. The detection/tracking software stops tracking when the cursor 410 moves off of the item 416. The detection/tracking software 111 then determines whether the item in the area of the cursor 410 (such as item 416 shown in FIG. 4) is of interest (515). For example, certain types of web page components may be of interest (e.g., images, hyperlinks, or objects). Detection/tracking software 111 may determine a component is of interest by determining whether the component matches a particular type of component. Detection/tracking software 111 may do so, for example, by analyzing the type of HTML tag used to include the component in the web page (e.g., <img> tag, <a> tag, or <object> tag). In some implementations, the detection/tracking software 111 may determine whether the component matches a designated type of component by determining whether the component is associated with a designated URL.

If the item is of interest, information related to the item is stored in a first buffer (525). The first buffer may be Buffer A described with respect to FIG. 4. Information related to the item may include, for example, a URL associated with the item, the size of the item (e.g., the dimensions of the item or the area of the item), a unique identifier associated with the item (e.g., a hash of the item), the type of the item (e.g., an image, a text line, or a flash object) and/or a URL associated with the web page in which the item was displayed. If the item is a text line, the textual content of the text line may be stored along with the href attribute of the text line (e.g., the URL associated with the textual content). If the item is an image, the "src attribute" of the image may be stored. If the item is a flash object, or includes other types of animated content, the "src parameter" of the object tag maybe stored.

If the item is not of interest, any data that is in the first buffer (e.g., buffer A) is cleared (520).

If the item is of interest, the process 500 continues when the user selects the item of interest (530). Detecting a user selection of the item of interest may include detecting that the user clicked on the item displayed in the webpage using, for example, a mouse or a stylus. The user also may select the item through other input devices, such as a keyboard. After being notified of the selection of the item, the detection/tracking software 111 copies the contents of the first buffer (e.g., buffer A 424), which includes the information related to the selected item, to the second buffer (e.g., buffer B 422) (535). The selection of the item of interest also may cause the browser application 112 to request data from a URL associated with the item of interest. The process 500 continues when the contents of the buffer B 424 are sent to the collection server 130 (540). Thus, the information associated with the selected item of interest is sent to the collection server 130. This information may be sent, for example, in the manner described with respect to FIG. 3. For example, the information associated with the selected item may be sent to the collection server 130 with the information about any requests/responses that result from the selection.

Referring to FIG. 6, the client system 110 sends, for example, data 600 to the collection server 130 using the eXtensible Markup Language (XML). The data 600 includes the selection information 134 and information about a data request/response that resulted from the selection 132. In the example shown in FIG. 6, the selection information indicates that the user of the client system 110 selected an image displayed on the "finance.yahoo.com" webpage. The selection information 134 also includes an identifier associated with the webpage on which the image is displayed (csu_id="1E57C253-E57F-48CA-9B30-57362E3E1323"), the height of the selected image (h="250, "), the width of the selected image (w="300, "), an identifier delineating a new selection, or click, this identifier is assigned to the new selection event (id="165538687"), a URL associated with the selected image, which may be referred to as the "link URL" (link="http://spe.atdmt.com/b/fxfxmfxcmeng/01149b_300x250.gif"), and is the URL from which the image was retrieved, a hash value of the selected image (hash="47b2ef333cb8b87ccd8e98818fb0bd2b"), and an indication of the type of tag used to embed the image (tag="img"). In other examples, the selected item may be a text line (e.g., tag="a"), an animated object, such as a flash object (e.g., tag="object"), or any other selectable item included in a webpage. The detection/tracking software 111 may determine whether a webpage component is of interest based on the Hypertext Markup Language (HTML) tag used to include the component in the webpage. For example, if the selection of advertisements by a user is of interest, the detection/tracking software 111 may determine that a webpage component is of interest if it is included in the webpage using an anchor tag, an image tag, or an object tag, since these HTML tags are the ones normally used to embed advertisements in a webpage. If selections of other items are of interest, the detection/tracking software 111 may be programmed to consider other tags of interest.

In the example shown in FIG. 6, the request/response information 132 includes the URL address of the website from which the client 110 requested data in response to the selection of the item, or as a result of a redirection, (http://www.fxcmtr.com/welcome/why-trade-currencies/oil-crashes.html?engine=yahoo+finance+ros+300*250&CMP=SFS-701300000003U6MAAU&keyword=01149b) denoted by the <url> tag. As noted above with respect to FIG. 3, this URL is not necessarily the URL corresponding to the destination website that the user visits as a result of selecting the item. The request/response information 132 also includes information related to the response sent to the client system 110 as a result of the request for data. In the example shown in FIG. 6, the request/response 132 indicates that the request for data resulted in an HTTP return code 200 (e.g., a successful request as opposed to a redirect) denoted by the <rc> tag. In particular, the receipt of a return code 200 indicates that the most recent URL requested by the browser is the destination website associated with the selected item. In the example shown in FIG. 6, the most recent URL requested by the browser is www.fxcmtr.com.

Also, it may be possible to tell that the image is an advertisement based on the link URL. For instance, in the example shown, the domain of the link URL is atdmt.com, which is known to be the domain of an advertising network.

The request/response information 132 also may include other data shown in the data 600. For example, the request/response information 132 also may include details associated with the browser application 112 running on the client system 110. In the example shown in FIG. 6, the client system 110 is running "Mozilla 4.0" (denoted by the <URL> tag). In other examples, the client system 110 may be running a different browser application 114. The request/response information may also include the method used to request the data (denoted by the <mt> tag), the version of the protocol used (denoted by the <cv> tag), and the referring URL (denoted by the <rf> tag), which is the URL that links (either directly or through redirection to the URL in the <URL> tag.

Figure 7:
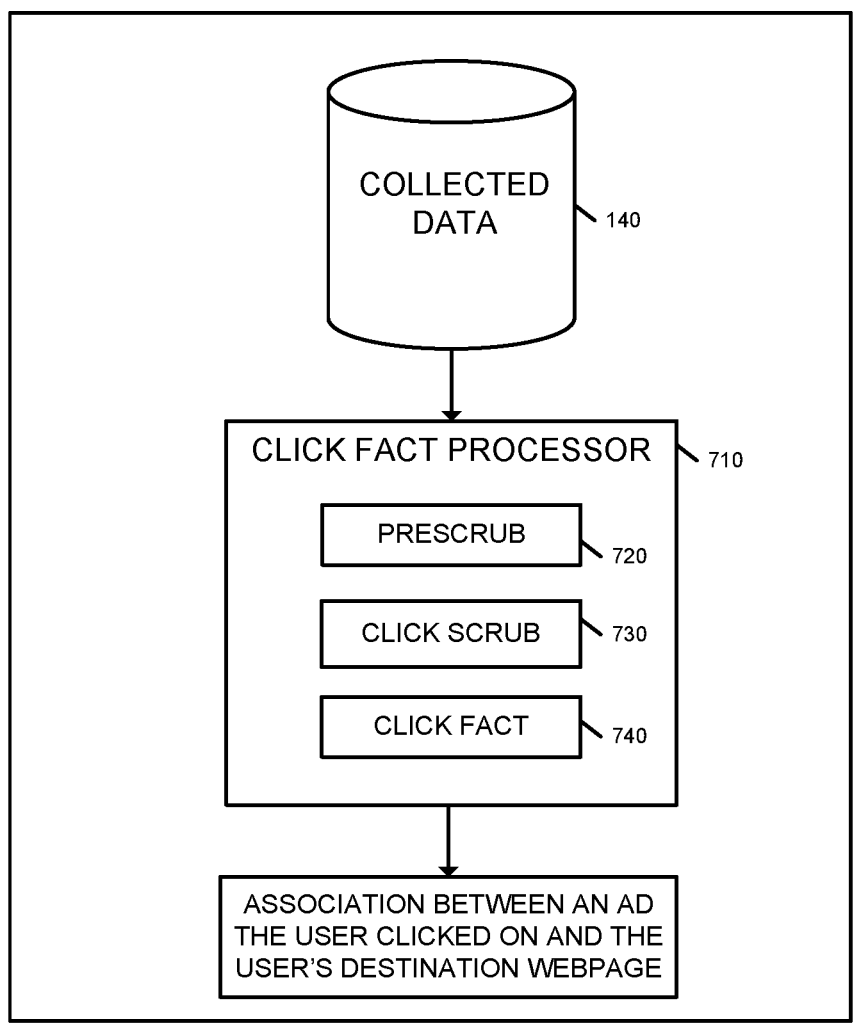
FIG. 7 illustrates a system 700 that determines an association between an item displayed in a webpage and selected by a user and the destination website that the user ended up viewing as a result of selecting the item.

FIG. 7 illustrates a system 700 that determines an association between an item displayed in a webpage and selected by a user and the destination webpage that the user ended up viewing as a result of selecting the item. In particular, the system 700 processes the data stored in the data store 140, which includes the request/response information 132 and the selection information 134, with a click fact processor 710 to determine the destination webpage associated with a particular selected item. The click fact processor 710 includes a prescrub component 720, a click scrub component 730, and a click fact component 740.

Figure 8:
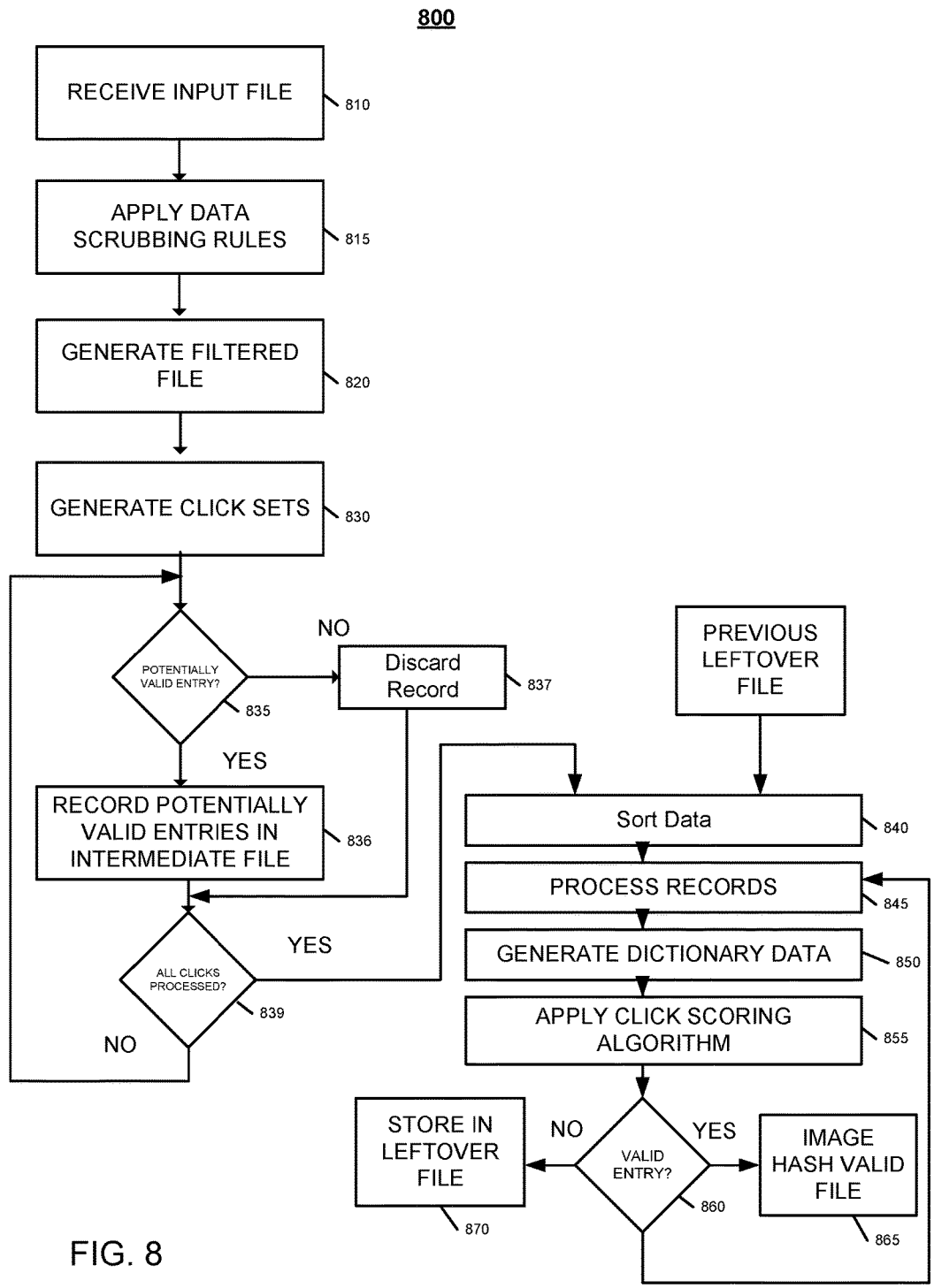
FIG. 8 illustrates an example of a process to determine an association between an item displayed in a webpage and selected by a user and the destination website that the user ended up viewing as a result of selecting the item.

Referring also to FIG. 8, an example process 800 may be used to implement the click fact processor 710. The process 800 may be referred to as the "click fact process." In some implementations, the example process 800 may be executed on a processor included in one or more collection servers 130. In other implementations, the example process 800 may be executed on a processor included in a centralized server that exchanges data with one or more collection servers 130. The process 800 begins with the prescrub component 720, and in particular when the processor receives an input file (810). In general, the processor receives data records 136 that include response/request information 132 and associated selection information 134 corresponding to selections of items of interest made by the panel 210 over a given temporal period. For example, the processor may receive all of the data records 136 corresponding to all of the selections that the panel 210 made over the course of a day, week, month, or a preset number of hours or days. Thus, the input file may be more than one input file and may be many thousands of data records 136 collected from the panel 210 over a given time period.

The input files may include multiple records, where each record includes selection information and request/response information about one request/response that resulted from selection of the item indicated by the selection information. Each record also may include data representing a unique identifier of the browser application 112 running on the particular client system on which the item was selected. This identifier also may be referred to as the machine identifier, and this identifier generally represents a client system associated with a member of the panel 210. For example, the machine identifier may represent a client such as client 212 described above with respect to FIG. 2. The selection information may include a unique identifier corresponding to the item that was selected. For example, the unique identifier may be a 32-bit hash of a selected advertising image, and the hash may be an MD5 hash. The hash may uniquely identify the selected item regardless of its format. The selection information also may include the HTML tag associated with the selected item. For example, the HTML tag may indicate whether the selected item is an image, textual data, an animated object, or some other type of web content.

Each record also may include a time stamp that indicates when an item was selected by a client system and/or a time stamp that indicates when a request occurred. The time stamp may be represented as the number of days or seconds between Jan. 1, 2000 and the instant when the item was selected and/or the request made. In other implementations, the time stamp may be the date and time at which the selection and/or request occurred. The request/response information in each record may include HTTP return codes received by the client as a result of selecting the item. The request/response information in each record also may indicate the browser application 112 that the client system was running when the user selected the item. Furthermore, the selection information may include the URL that the selected item is associated with (the URL from which the selected item was retrieved by the browser). This URL may be referred to as the "link URL." The input file also may include a counter that indicates how many responses and requests have been sent to the collection server as a result of the selection of the item. For example, if the counter is five, then the selection of the item has resulted in five requests and responses. Additionally, the counter is incremented for each additional request made as a result of selecting the item. Thus, continuing this example, if the selection of the item resulted in another request, the counter would be incremented to six. The counter may be reset when a new item is selected.

The process 800 continues by applying data scrubbing rules to the input files (815). The same data scrubbing rules may be applied to each of the input files. In particular, the data scrubbing rules may filter, or condition, the input files such that records that do not conform to the rules are removed and not processed further. The data scrubbing rules may include a rule that filters data from the input files that does not have a particular HTML tag. For example, in one implementation, the data scrubbing rules may be designed to consider image advertisements, but not Shockwave advertisements. In this implementation, the data scrubbing rules may include a rule that data associated with a "IMG" tag are processed while data associated with "OBJECT" (e.g., Shockwave) or "A" (e.g., hyperlink text) tags be discarded and/or ignored.

The data scrubbing rules also may include a filter that removes data that does not have a hash value from the input files. Because the image hash value may be used to uniquely identify the selected item and associate it with a destination web site, the process 800 may be unable to associate selected items that do not have a unique identifier with a destination webpage. The data scrubbing rules also may include a condition that the data be associated with a machine identifier that indicates from which panelist machine the data originated. Additionally, the data scrubbing rules may include a filter that removes data in which the selected item has a link URL that corresponds to domains such as "images.google" or "akamai." Such a rule enables images that may be the same size as standard advertisements (e.g., the images have a size that is the same as a standard advertisement size defined by the Interactive Advertising Bureau (IAB)), but are not advertisements.

The process 800 continues by generating a filtered file (820). The filtered file includes the same data included in the input file, but the filtered file may have less data as a result of the application of the data scrubbing rules to the input file in (815).

The process 800 continues with the click scrub component 730 when the filtered input file is used to generate click sets (830). Each click set may correspond to a unique selection event, such as a panelist selecting an item of interest. The click sets may be generated by sorting the filtered input file from (820) by the hash values, the machine identifier, and the time stamp of the selections and/or requests. From this sorting process, the aggregation of selections may be broken down into click sets that correspond to a particular selection by a panelist and the resulting requests and responses. For example, the filtered input file may include many selections, and data indicating requests and responses that occurred at the same, or similar, time (as indicated by the time stamp value) and on the same machine identifier may have all resulted from the same selection. Thus, this data may be included in one click set to represent a single click event. The data that is included in the click set may then be filtered to remove data that does not correspond to a HTTP return code 200, or some other code or value that represents a successful data request. In this manner, the click set data may be reduced from including all of the requests made by the browser application 112 and responses received by the browser application 112 as a result of the user's selection of the item to including the request/response information that is associated with the webpage that the user ended up actually viewing as a result of selecting the item in the webpage (e.g, the destination webpage that is associated with a destination URL).

The process 800 continues by determining whether each filtered click set is a potentially valid entry (835). In the example shown in FIG. 8, the filtered click sets are considered one-by-one until all of the filtered click sets have been considered. For example, the filtered click set is a valid entry if the hash associated with the filtered click set is present in a data record, or data dictionary, that includes known valid image hashes based on historical data. If the hash in the filtered click set is one that is in the dictionary, the filtered click set is marked as a valid entry. In this case, the click scoring algorithm, described in more detail below with respect to FIG. 9, is not applied. Potentially valid entries also may be selected according to various selection rules, which may be fetched or imported from an external XML, file. The selection rules include discarding a filtered click set if the hash value included in the filtered click set is present in an invalid hash dictionary. Similar to the valid hash dictionary, the invalid hash dictionary includes hash values known to be invalid based on historical data. The selection rules also may include excluding filtered clicks where the link URL is the same as the URL of the destination web site. When these two URLs are the same, it may indicate that the selection was internal navigation rather than a selection of an external item of interest, such as an advertising image.

This selection rule also may include a second condition that does not discard such a filtered click set if the selected image has a size that corresponds to a standard Interactive Advertising Bureau (IAB) advertising size. For example, the selection rules may include a rule to discard click sets that are associated with a selected item that has an IAB advertising size ID of 10. Such items generally correspond to a navigation button on the browser application 112 (such as "NEXT" or "BACK") rather than an advertising image, or other item of interest. Table 1 shows a chart of the current standard IAB advertising sizes. The chart includes an identifier of a particular type of advertising content, a description of a particular type of advertising content, and the height and width of the advertising content in pixels.

TABLE 1

Standard IAB Advertising Sizes

| ID | Width | Height | Description |
|----|-------|--------|-------------|
| 2  | 300   | 600    | Half-page advertisement |
| 3  | 120   | 600    | Skyscraper |
| 4  | 160   | 600    | Wide skyscraper |
| 5  | 728   | 90     | leaderboard |
| 6  | 125   | 125    | Square button |
| 7  | 120   | 240    | Vertical banner |
| 8  | 120   | 60     | Button 2 |
| 9  | 120   | 90     | Button 1 |
| 10 | 88    | 31     | Micro bar |
| 11 | 234   | 60     | Half banner |
| 12 | 468   | 60     | Full banner |
| 13 | 180   | 150    | Rectangle |
| 14 | 336   | 280    | Large rectangle |
| 15 | 240   | 400    | Vertical rectangle |
| 16 | 250   | 250    | Square popup |
| 17 | 300   | 250    | Medium rectangle |

The selection rules also may include rules such as the filtered click set is not valid if its destination URL includes an image server such as "images.search.yahoo.com," if the destination URL includes "login.*" or "logout*," or if the destination URL includes a known advertisement server.

The process 800 continues when valid filtered click sets, or entries, as determined by the selection rules are recorded in an intermediate file (836). Entries that are not valid are discarded (837). In the example shown in FIG. 8, the processor then determines whether all of the filtered click sets have been processed with the selection rules in (835). If all of the filtered click sets have not been processed, the process 800 determines if the next click set is a valid entry. If all of the click sets have been processed, the process 800 sorts the intermediate file recorded in (837) and the leftover file, if any, from previous processing, by the image hash and the destination URL values in the files. The sorted intermediate file is processed (845) to generate dictionary data (850). The dictionary data may include the following information: image hash value, destination URL, the click count (e.g., the number of unique selections), the number of machine identities that selected the item, and, if one unique machine selected the item, the value of the machine identity of the machine that selected the item. Thus, the dictionary data includes an association between a destination and an image hash value (which represents the selected item). Process 800 continues when the click scoring algorithm is applied to the leftover file and the intermediate file (855). The click scoring algorithm is described in more detail with respect to FIG. 9. Entries that are selected by the click scoring algorithm are saved as valid entries in the image hash valid file (865). Entries that are not selected by the click scoring algorithm may be saved to the leftover file for later processing by the example process 800 (870).

Figure 9B:
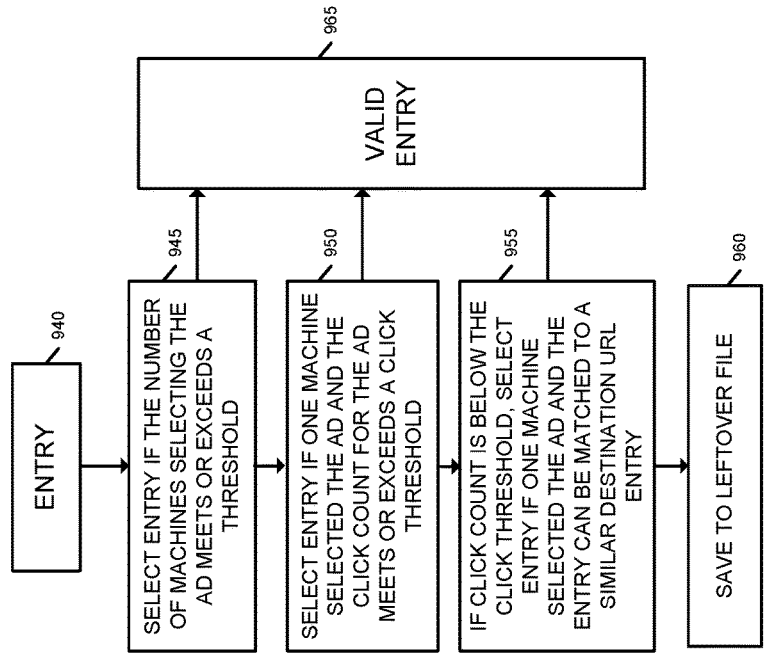
FIG. 9B shows another example of click scoring process.
Figure 9A:
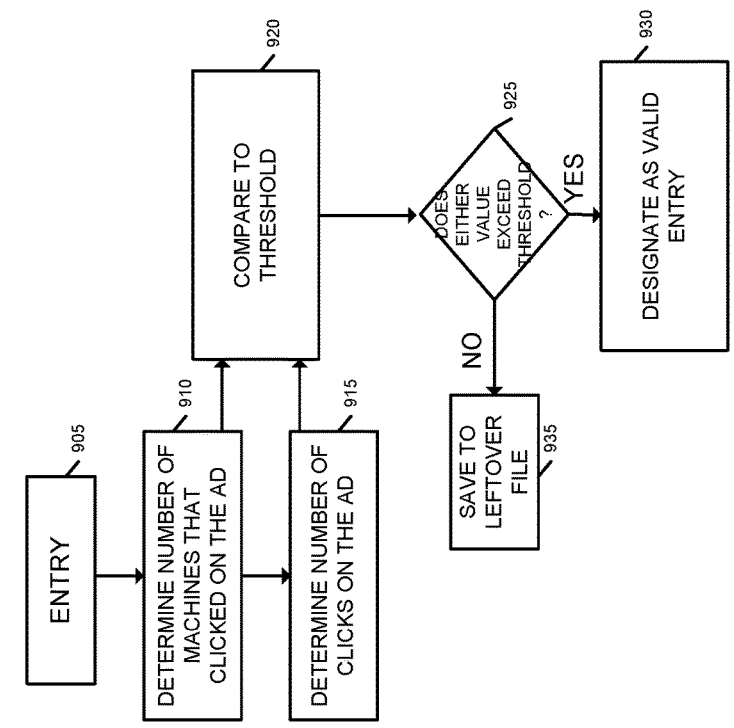
FIG. 9A shows an example click scoring process.

Referring to FIGS. 9A and 9B, the click scoring algorithm introduced in FIG. 8 (855) may determine whether an entry (or click set) included in the intermediate file or the leftover file is a valid entry. FIG. 9A shows an example click scoring process 900A. The process 900A begins when an entry from the intermediate file or the leftover file is read (905). The process parses the entry to determine the number of machines that selected the item (e.g., an advertising image displayed in a webpage) (910) and the number of selections of the item (915). The process 900A compares these values to a predetermined threshold (920). If either value exceeds the threshold, the entry is designated as a valid entry (930).

FIG. 9B shows another example of click scoring process 900B. The click scoring process 900B may select multiple destination URLs for the same image hash. Thus, process 900B may account for circumstances where an item with a particular image hash value is associated with different destination URLs. The process 900B begins when an entry from the intermediate file or the leftover file is read (940). The process 900B parses the entry to determine the number of machines that selected the item associated with the entry. The process 900B then compares this value to a threshold (945). If the value exceeds the threshold, the entry is designated as valid (965). If the value does not exceed the threshold, the entry is selected as valid if one machine selected the item associated with the entry, and the machine selected the item more times than a predetermined click threshold (950). If the number of selections of the item is below the click threshold, the entry associated with the item is selected as valid if one machine selected the item and the entry can be matched to a similar destination URL in the image hash set. Entries that are not selected are saved to the leftover file (960).

Figure 10:
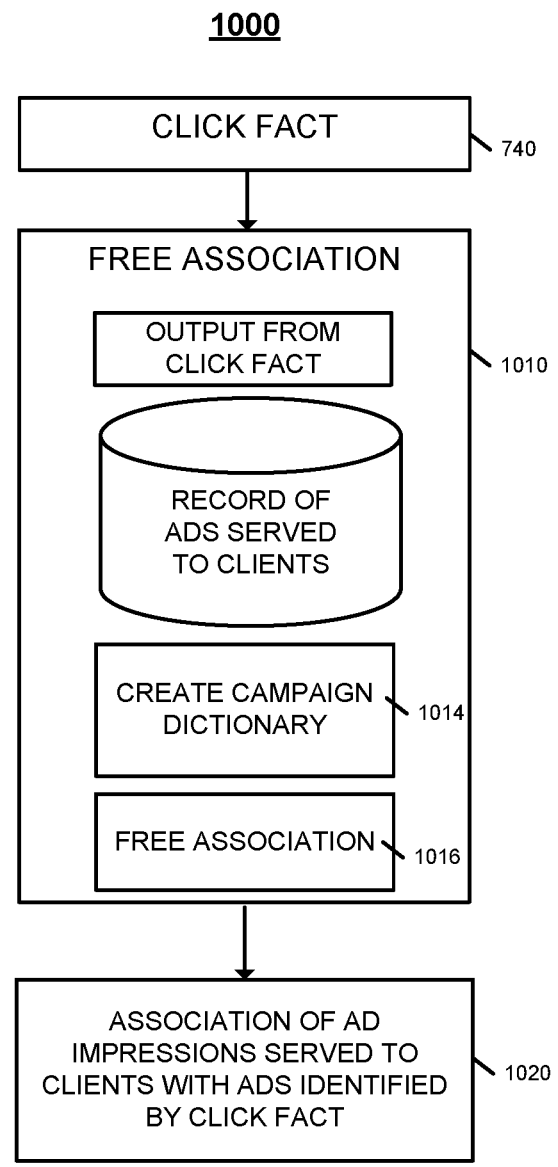
FIG. 10 illustrates a system to associate advertising impressions that are served to clients with previously identified advertisements.

Referring to FIG. 10, a system 1000 uses the output from the click fact process described above with respect to FIGS. 7-9 to associate advertising impressions that are served to clients with the advertisements identified in the click fact process. In particular, the system 1000 includes the output from click fact (e.g., the image hash valid file), a free association component 1010, and an output 1020 that associates advertising impressions with advertising identified by click fact. The free association component 1010 includes a process 1014 to create a campaign dictionary and a free association process 1016.

In general, the free association component 1010 is based on the observation that advertisers tend to use a systematic method of delivering advertisements to potential customers through a network of computers, such as the Internet. The link URL, which is the URL from which a web browser retrieves an advertisement, typically includes an identifier that is associated with a campaign (e.g., an advertising campaign for a particular advertiser, brand, or provider of services). This identifier may be referred to as a tracking identifier, or tracking ID. Because the data from the click fact process 800 is based on data generated by the panel 210, which may be a subset of the Internet population, the data from the click fact process 800 may not include all of the advertisements selected. Additionally, some advertisements included in a campaign are rarely, or never, selected by the panel 210 while other advertisements are selected often. Furthermore, as described above, different advertisements may be used during a campaign and/or the advertisement(s) for a campaign may be distributed using multiple ad networks.

Accordingly, the click fact process 800 may not be able to obtain data on all of the advertising images in a campaign and therefore it may be difficult, or impossible, to determine that some of the images shown to users in the panel 210 (and captured in the request/response information 132) are part of an advertising campaign and should be counted in the impressions. Advertisers, however, generally desire a report on the entire campaign so that a complete analysis of the campaign may be calculated. They accordingly want a report on impressions and/or selections that take into account all of the images in a campaign. By establishing a campaign dictionary that includes the tracking identifiers used by advertisers it may be possible to freely associate selection of an item in a webpage with the observation of the other advertisements made by the panel 210.

For example, an advertiser xyz.abc may serve advertisements that include a link URL in the form of: http://ads.xyz.abc/id/123456/colorful_ad.gif and http://ads.xyz.abc/id/123456/boring_ad.swf. Continuing this example, at least one member of the panel 210 has selected the "colorful_ad.gif" advertisement, but no member of the panel 210 has selected the "boring_ad.swf" advertisement. It may be determined by parsing through the image hash valid output file from the click fact process 800 that 123456 is a valid advertisement identifier (tracking identifier) and that URLs with this identifier point to the abc.abc site (e.g., selecting the advertisement results in reaching abc.abc as the destination webpage). Thus, the boring_ad.swf may also be identified as an advertisement that also has a destination webpage of abc.abc. As a result, when the request/response information 132 indicates that the "boring_ad.swf" advertisement has been displayed to a member of the panel 210, it can be included in the campaign associated with the abc.abc webpage (and therefore may be associated with a brand associated with the abc.abc webpage).

A "tracking identifier" for any given design will generally be whatever indicates a logical relationship between the advertisements. For instance, the number "123456" may include a portion that represents the campaign and another portion that represents the creative. For example, within the number "123456, " the first three characters ("123") may indicate the campaign while the last three characters ("456") identify the particular advertisement shown. Thus, in this implementation, the first three characters are the tracking identifier because they indicate the logical relationship between the two advertisements (e.g., being part of the same campaign).

Figure 11:
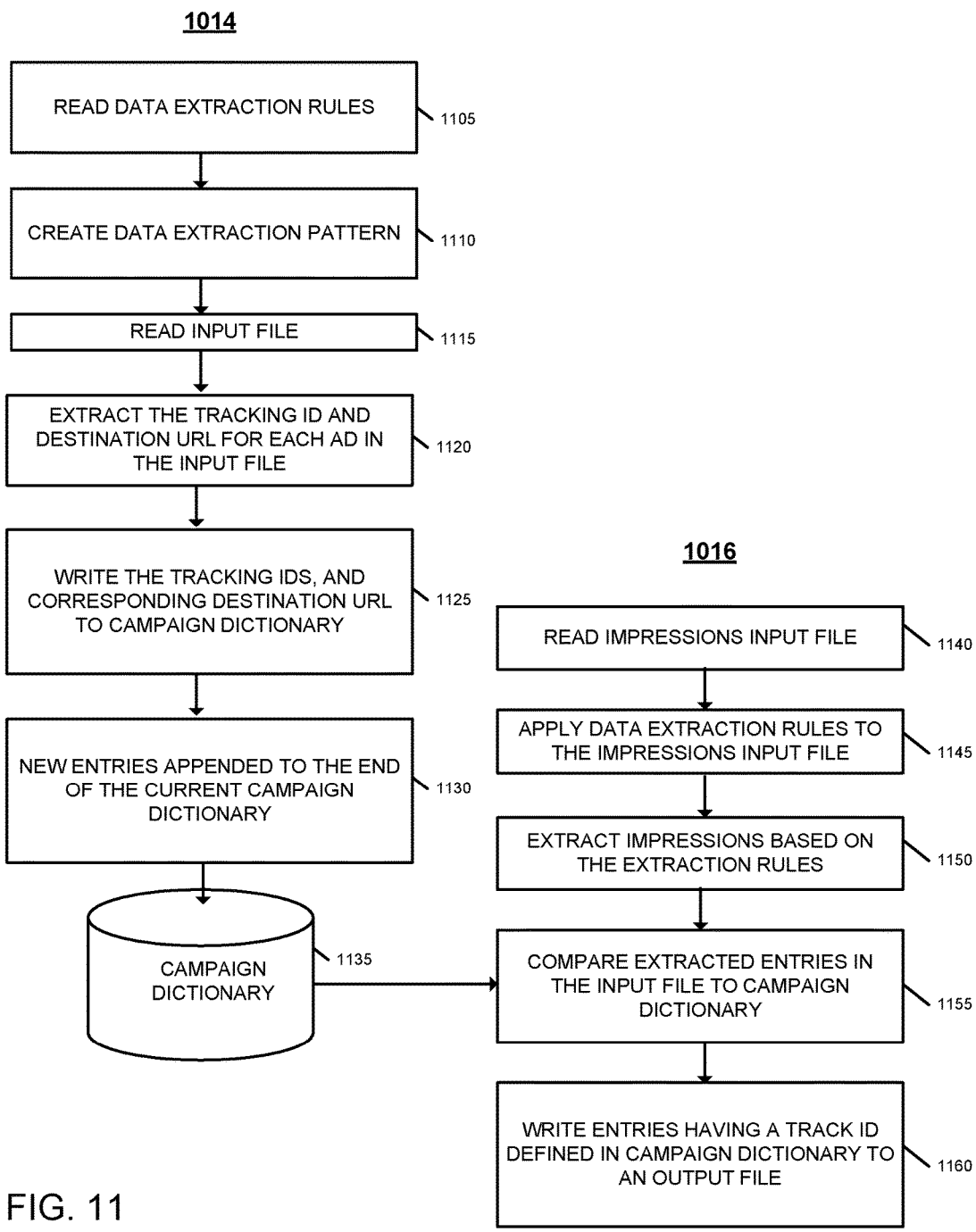
FIG. 11 illustrates a process to associate advertising impressions that are served to clients with previously identified advertisements.

Referring to FIG. 11, the process 1014 may create a campaign dictionary and the process 1016 may associate advertising impressions served to clients with advertising identified by the click fact process described with respect to FIG. 8.

The process 1014 to create a campaign dictionary begins when data extraction rules are read by a processor (1105). The data extraction rules are used to create a data extraction pattern, such as a regular expression that may be used to extract the tracking identifier from the link URL associated with known advertisements, such as those in the image hash valid file (1110). For example, the extraction pattern may be a regular expression for each known advertisement server that includes a tracking identifier. The data extraction pattern may be saved in an external rule file, which may be in XML format. The process 1014 continues when an input file is input (1115). The input file is a file that indicates that a selection is valid for a particular hash. For example, the input file may be the image hash valid file from the click fact process described above with respect to FIG. 8. The regular expression may be used to extract a tracking identifier of an advertising campaign with which an advertising image is associated. As described above, the tracking identifier is generally included in the link URL associated with the advertising image. The process 1014 continues when the tracking identifier is extracted from the link URL for each image hash in the image hash valid file (1120). The tracking identifiers and the corresponding destination URLs are written to the campaign dictionary (1125). New entries in the campaign dictionary are appended to the end of the current campaign dictionary (1130). This results in the creation of the campaign dictionary (1135).

The free association process 1016 uses the campaign dictionary created in (1135) to associate advertising impressions with identified advertisements. The process 1016 begins when an input file that includes a record of the advertising impressions (e.g., a record of link URLs) presented to the client systems 212, 214, 216, and 218 in the panel 210 is read (1140). The process continues when data extraction rules are applied to the record of advertising impressions (e.g., data extraction rules are applied to the link URLS to identify tracking identifiers in the link URLs (1145). The extraction rules may be included in an external XML file and may include any rules that applied in marking an entry as valid, as described above with respect to FIG. 8 (836). The impressions are extracted based on the extraction rules (e.g., tracking identifiers are extracted) (1150). Extracted impressions (e.g., extracted tracking identifiers) are compared against the entries in the campaign dictionary (1160). Entries (e.g., link URLs) that have an extracted tracking identifier defined in the campaign dictionary are written to an output file along with the destination URL associated with the tracking identifier in the campaign dictionary (1160).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A method, comprising:
receiving, from one or more computers of a panel of computers, a first set of data related to user interaction with a first set of interactive interface components, wherein the first set of data comprises a first set of source addresses for retrieving the first set of interactive interface components and a first set of destination addresses identifying network locations to which the one or more computers in the panel were directed after a user of the computer interacted with one of the first set of interactive interface components, and wherein each of the first set of interactive interface components comprises an advertisement;
accessing, from the first set of data by one or more computers, a first source address for retrieving a first interactive interface component presented by a first computer in the panel, the first source address for retrieving the first interactive interface component including a first tracking identifier, wherein the first source address for retrieving the first interactive interface component is an address that directly results in retrieval of the first interactive interface component;
extracting, by the one or more computers, the first tracking identifier from the first source address for retrieving the first interactive interface component; and
storing, by the one or more computers, an association between the first tracking identifier and a first destination address to which the first computer in the panel was directed after a user of the first computer in the panel interacted with the first interactive interface component.

2. The method of claim 1, further comprising:
receiving, from the one or more computers of the panel of computers, a second set of data related to a second set of interactive interface components presented by the one or more computers of the panel of computers and not interacted with by any users, wherein the second set of data comprises a second set of source addresses for retrieving the second set of interactive interface components, and wherein each of the second set of interactive interface components comprises an advertisement;
accessing, from the second set of data by the one or more computers, a second source address for retrieving a second interactive interface component presented by a second computer in the panel and not interacted with by any user of the panel of computers, the second source address for retrieving the second interactive interface component including a second tracking identifier, wherein the second source address for retrieving the second interactive interface component is an address that directly results in retrieval of the second interactive interface component;
extracting, by the one or more computers, the second tracking identifier from the second source address included in the accessed second set of data;
determining, by the one or more computers, that the second tracking identifier matches a tracking identifier stored by the one or more computers; and
storing, by the one or more computers, an association between the second interactive interface component that was not interacted with by any user of the panel of computers and a destination address associated with the matching tracking identifier stored by the one or more computers.

3. The method of claim 1, further comprising filtering the received first set of data related to user interaction with the first set of interactive interface components by determining that a subset of the received first set of data is valid, wherein the accessed first source address is included in the subset of the received first set of data determined to be valid.

4. The method of claim 3, wherein determining that a subset of the received first set of data is valid comprises:
determining, for one or more of the first set of interactive interface components, a number of times users of the panel of computers interacted with the one of the first set of interactive interface component;
comparing the determined number of times users of the panel of computers interacted with the one of the first set of interactive interface component to a predetermined threshold of interactions; and
designating data in the received first set of data associated with the one of the first set of interactive interface component is valid when the determined number of times users of the panel of computers interacted with the one of the first set of interactive interface component exceeds the predetermined threshold of interactions.

5. The method of claim 1, wherein storing, on the one or more computers, the association between the first tracking identifier and the first destination address to which the first computer in the panel was directed after the user of the first computer interacted with the first interactive interface component comprises:
accessing information associated with multiple requests and responses resulting from the user of the first computer's interaction with the first interactive interface component, wherein the multiple requests and responses comprise one or more requests by the first computer to one or more intermediate resources associated with the user of the first computer's interaction with the first interactive interface component, one or more responses from the one or more intermediate resources that cause the first computer to be redirected to one or more other resources, a request to a destination server for a destination network resource associated with the first destination address as a result of one of the redirections of the first computer, and a response from the destination server that includes the destination network resource, and
determining that the request to the destination server for the destination network resource associated with the first destination address ultimately resulted from the user of the first computer's interaction with the first interactive interface component; and
based on the determination that the request to the destination server for the destination network resource associated with the first destination address ultimately resulted from the user of the first computer's interaction with the first interactive interface component, associating the first interactive interface component with the first destination address.

6. The method of claim 1, wherein the interactive interface components of the first set of interactive interface components are each displayed, in association with content derived from a network resource, by a web-enabled client application executing on a respective computer of the panel of computers.

7. The method of claim 1, wherein the association between the first tracking identifier and the first destination address to which the first computer in the panel was directed after a user of the first computer interacted with the first interactive interface component is stored in a dictionary, the dictionary storing multiple associations between the tracking identifiers and the destination addresses.

8. A non-transitory computer-readable medium comprising instructions that, when executed by one or more processors, cause the one or more processors to perform operations comprising:
   receiving, from one or more computers of a panel of computers, a first set of data related to user interaction with a first set of interactive interface components, wherein the first set of data comprises a first set of source addresses for retrieving the first set of interactive interface components and a first set of destination addresses identifying network resources to which computers in the panel were directed after a user of the computer interacted with one of the first set of interactive interface components, and wherein each of the first set of interactive interface components comprises an advertisement;
   accessing, from the first set of data, a first source address for retrieving a first interactive interface component presented by a first computer in the panel, the first source address for retrieving the first interactive interface component including a first tracking identifier, wherein the first source address for retrieving the first interactive interface component is an address that directly results in retrieval of the first interactive interface component;
   extracting the first tracking identifier from the first source address for retrieving the first interactive interface component; and
   storing an association between the first tracking identifier and a first destination address to which the first computer in the panel was directed after a user of the first computer interacted with the first interactive interface component.

9. The non-transitory computer-readable medium of claim 8, wherein the instructions further comprise instructions that, when executed by one or more processors, cause the one or more processors to perform operations comprising:
   receiving, from the one or more computers of the panel of computers, a second set of data related to a second set of interactive interface components presented by the one or more computers of the panel of computers and not interacted with by any users, wherein the second set of data comprises a second set of source addresses for retrieving the second set of interactive interface components, and wherein each of the second set of interactive interface components comprises an advertisement;
   accessing, from the second set of data, a second source address for retrieving a second interactive interface component presented by a second computer in the panel and not interacted with by any user of the panel of computers, the second source address for retrieving the second interactive interface component including a second tracking identifier, wherein the second source address for retrieving the second interactive interface component is an address that directly results in retrieval of the second interactive interface component;
   extracting the second tracking identifier from the second source address included in the accessed second set of data;
   determining that the second tracking identifier matches a stored tracking identifier; and
   storing an association between the second interactive interface component that was not interacted with by any user of the panel of computers and a destination address associated with the matching stored tracking identifier.

10. The non-transitory computer-readable medium of claim 8, wherein the instructions further comprise instructions that, when executed by one or more processors, cause the one or more processors to perform operations comprising filtering the received first set of data related to user interaction with the first set of interactive interface components by determining that a subset of the received first set of data is valid, wherein the accessed first source address is included in the subset of the received first set of data determined to be valid.

11. The non-transitory computer-readable medium of claim 10, wherein the instructions causing the one or more processors to perform the operation of determining that a subset of the received first set of data is valid comprise instructions that, when executed by the one or more processors, cause the one or more processors to perform operations comprising:
   determining, for one or more of the first set of interactive interface components, a number of times users of the panel of computers interacted with the one of the first set of interactive interface component;
   comparing the determined number of times users of the panel of computers interacted with the one of the first set of interactive interface component to a predetermined threshold of interactions; and
   designating data in the received first set of data associated with the one of the first set of interactive interface component is valid when the determined number of times users of the panel of computers interacted with the one of the first set of interactive interface component exceeds the predetermined threshold of interactions.

12. The non-transitory computer-readable medium of claim 8, wherein the instructions causing the one or more processors to perform the operation of storing the association between the first tracking identifier and the first destination address to which the first computer in the panel was directed after the user of the first computer interacted with the first interactive interface component comprise instructions that, when executed by the one or more processors, cause the one or more processors to perform operations comprising:
   accessing information associated with multiple requests and responses resulting from the user of the first computer's interaction with the first interactive interface component, wherein the multiple requests and responses comprise one or more requests by the first computer to one or more intermediate resources associated with the user of the first computer's interaction with the first interactive interface component, one or more responses from the one or more intermediate resources that cause the first computer to be redirected to one or more other resources, a request to a destination server for a destination network resource associated with the first destination address as a result of one of the redirections of the first computer, and a response from the destination server that includes the destination network resource;

determining that the request to the destination server for the destination network resource associated with the first destination address ultimately resulted from the user of the first computer's interaction with the first interactive interface component; and based on the determination that the request to the destination server for the destination network resource associated with the first destination address ultimately resulted from the user of the first computer's interaction with the first interactive interface component, associating the first interactive interface component with the first destination address.

13. The non-transitory computer-readable medium of claim 8, wherein the interactive interface components of the first set of interactive interface components are each displayed, in association with content derived from a network resource, by a web-enabled client application executing on a respective computer of the panel of computers.

14. The non-transitory computer-readable medium of claim 8, wherein the association between the first tracking identifier and the first destination address to which the first computer in the panel was directed after a user of the first computer interacted with the first interactive interface component is stored in a dictionary, the dictionary storing multiple associations between the tracking identifiers and the destination addresses.

15. A computing device comprising:
one or more processors; and
a memory comprising instructions that, when executed by the one or more processors, cause the one or more processors to perform operations comprising:
receiving, from one or more computers of a panel of computers, a first set of data related to user interaction with a first set of interactive interface components, wherein the first set of data comprises a first set of source addresses for retrieving the first set of interactive interface components and a first set of destination addresses identifying network resources to which computers in the panel were directed after a user of the computer interacted with one of the first set of interactive interface components, and wherein each of the first set of interactive interface components comprises an advertisement;
accessing, from the first set of data, a first source address for retrieving a first interactive interface component presented by a first computer in the panel, the first source address for retrieving the first interactive interface component including a first tracking identifier, wherein the first source address for retrieving the first interactive interface component is an address that directly results in retrieval of the first interactive interface component;
extracting the first tracking identifier from the first source address for retrieving the first interactive interface component; and
storing an association between the first tracking identifier and a first destination address to which the first computer in the panel was directed after a user of the first computer interacted with the first interactive interface component.

16. The computing device of claim 15, wherein instructions further comprise instructions that, when executed by one or more processors, cause the one or more processors to perform operations comprising:
receiving, from the one or more computers of the panel of computers, a second set of data related to a second set of interactive interface components presented by the one or more computers of the panel of computers and not interacted with by any users, wherein the second set of data comprises a second set of source addresses for retrieving the second set of interactive interface components, and wherein each of the second set of interactive interface components comprises an advertisement;
accessing, from the second set of data, a second source address for retrieving a second interactive interface component presented by a second computer in the panel and not interacted with by any user of the panel of computers, the second source address for retrieving the second interactive interface component including a second tracking identifier, wherein the second source address for retrieving the second interactive interface component is an address that directly results in retrieval of the second interactive interface component;
extracting the second tracking identifier from the second source address included in the accessed second set of data;
determining that the second tracking identifier matches a stored tracking identifier; and
storing an association between the second interactive interface component that was not interacted with by any user of the panel of computers and a destination address associated with the matching stored tracking identifier.

17. The computing device of claim 15, wherein the instructions further comprise instructions that, when executed by one or more processors, cause the one or more processors to perform operations comprising filtering the received first set of data related to user interaction with the first set of interactive interface components by determining that a subset of the received first set of data is valid, wherein the accessed first source address is included in the subset of the received first set of data determined to be valid.

18. The computing device of claim 17, wherein the instructions causing the one or more processors to perform the operation of determining that a subset of the received first set of data is valid comprise instructions that, when executed by the one or more processors, cause the one or more processors to perform operations comprising:
determining, for one or more of the first set of interactive interface components, a number of times users of the panel of computers interacted with the one of the first set of interactive interface component;
comparing the determined number of times users of the panel of computers interacted with the one of the first set of interactive interface component to a predetermined threshold of interactions; and
designating data in the received first set of data associated with the one of the first set of interactive interface component is valid when the determined number of times users of the panel of computers interacted with the one of the first set of interactive interface component exceeds the predetermined threshold of interactions.

19. The computing device of claim 15, wherein the instructions causing the one or more processors to perform the operation of storing the association between the first tracking identifier and the first destination address to which the first computer in the panel was directed after the user of the first computer interacted with the first interactive interface component comprise instructions that, when executed by the one or more processors, cause the one or more processors to perform operations comprising:

accessing information associated with multiple requests and responses resulting from the user of the first computer's interaction with the first interactive interface component, wherein the multiple requests and responses comprise one or more requests by the first computer to one or more intermediate resources associated with the user of the first computer's interaction with the first interactive interface component, one or more responses from the one or more intermediate resources that cause the first computer to be redirected to one or more other resources, a request to a destination server for a destination network resource associated with the first destination address as a result of one of the redirections of the first computer, and a response from the destination server that includes the destination network resource;

determining that the request to the destination server for the destination network resource associated with the first destination address ultimately resulted from the user of the first computer's interaction with the first interactive interface component; and based on the determination that the request to the destination server for the destination network resource associated with the first destination address ultimately resulted from the user of the first computer's interaction with the first interactive interface component, associating the first interactive interface component with the first destination address.

20. The computing device of claim 15, wherein the interactive interface components of the first set of interactive interface components are each displayed, in association with content derived from a network resource, by a web-enabled client application executing on a respective computer of the panel of computers.

\* \* \* \* \*